US005569351A

United States Patent [19]

Menta et al.

[11] Patent Number: 5,569,351

[45] Date of Patent: Oct. 29, 1996

[54] BANDING MACHINE HAVING IMPROVED FILM REGISTRATION SYSTEM

[75] Inventors: William J. Menta, W. Wyoming; Michael Yager, Shaver, both of Pa.

[73] Assignee: CMS Gilbreth Packaging Systems, Inc., Trevose, Pa.

[21] Appl. No.: 337,745

[22] Filed: Nov. 14, 1994

[51] Int. Cl.$^{6}$ .............................. B32B 31/00; B26D 5/00

[52] U.S. Cl. .......................... 156/353; 156/354; 156/361; 156/362; 53/64; 53/296; 53/585; 53/589

[58] Field of Search .................................... 156/353, 354, 156/361, 362, 363, 364; 53/52, 64, 291, 292, 293, 294, 295, 296, 297, 582, 585, 589

[56] References Cited

U.S. PATENT DOCUMENTS

| | | | |
|---|---|---|---|
| 3,924,387 | 12/1975 | Konstantin | 53/297 X |
| 4,519,868 | 5/1985 | Hoffmann | 156/353 |
| 4,538,515 | 9/1985 | Tymkewicz et al. | 364/469 X |
| 4,562,684 | 1/1986 | Dreher | 53/64 |
| 4,806,187 | 2/1989 | Fujisawa | 53/297 X |
| 5,101,613 | 4/1992 | Wilhelm et al. | 53/567 |
| 5,197,259 | 3/1993 | Menayan | 53/585 X |
| 5,235,515 | 8/1993 | Ungpiyakul et al. | 156/354 X |
| 5,279,696 | 1/1994 | Zangenfeind et al. | 156/354 |

OTHER PUBLICATIONS

Brochure entitled Tamp–R–Alert® System TRA–II Shrink–Bander.

*Primary Examiner*—David A. Simmons
*Assistant Examiner*—Paul M. Rivard
*Attorney, Agent, or Firm*—Morgan & Finnegan, L.L.P.

[57] ABSTRACT

A banding machine applies labels to the top of containers and has a frame with a turret plate rotatably mounted thereon and driven by a drive mechanism. Band holders are positioned on the turret plate and receive cut film sleeves having spaced indicia thereon in an unopened, flattened condition. The band holders open the band into a circular sleeve, and then hold and move the band onto the top of a vertically oriented container advancing into a banding position as the turret plate rotates. A registration sensor senses film indicia before label cutting and generates a signal indicative of the sensed registration. A controller stops film advancement upon the sensor's detection of film indicia so as to initiate film cutting and initiate film feeding again to advance film a predetermined amount for a newly cut label. The feed roller is initiated for feeding film upon rotation of the turret plate and movement of a band holder into an indexed position. The feed roller initiator mechanism includes a sensor mounted on the frame for selective movement in an arcuate arc adjacent the circular arc defined by the band holders as the turret plate rotates so that the sensed position of the band holder relative to the cutting motion of the blade can be varied to ensure feeding of film during a noncutting sequence. In another aspect of the invention, the registration sensor is movable linearly in the direction of film feed so as to adjust the stopping and cutting of film at a predetermined film location corresponding to a desired film indicia.

37 Claims, 5 Drawing Sheets

BANDING MACHINE HAVING IMPROVED FILM REGISTRATION SYSTEM

FIELD OF THE INVENTION

This invention relates to a banding machine for advancing and cutting film for delivery into band holders that open the band into a circular sleeve and place the band onto the top of vertically oriented containers advancing into a banding position.

BACKGROUND OF THE INVENTION

The Tylenol® scare in the 1970's created a need for equipment which delivers tamper-resistant bands at fast, efficient, production-line speeds onto containers such as prescription bottles, food products, and other containers. Unsettled social conditions pose increased risks for manufacturers of consumer products because troubled individuals and dissatisfied employees can hold entire production lots hostage through tampering. To release any tampered products could create consumer panic. The result for any company releasing such a product could be catastrophic lawsuits or bankruptcies.

Shrink-banded, tamper-resistant packaging is a cost-effective way to reduce these risks, because a band is tightly encircled around the cap of a container. It would be impossible to tamper with such a container without breaking its seal.

One series of banding machines used for such purposes is sold by CMS Machine Systems under the designation TAMP-R-ALERT®. Such machines have a frame and a turret plate rotatably mounted in vertical orientation on the frame. The turret plate also defines an upper band entrance position for receiving cut film sleeve material having spaced indicia thereon in a flattened condition. The turret plate defines a lower banding position, where opened band sleeves are inserted onto vertically oriented containers conveyed along an article conveyor into the banding position.

A plurality of band holders are substantially, evenly spaced on the turret plate for receiving an unopened, flattened band at the band entrance position, opening the band into a circular sleeve, and holding and moving the band into the banding position and onto the top of a vertically oriented container advancing into the banding position. A feed roller and stepper motor system feeds film into a cutter, which cuts the film for delivery to the band holders which typically are vacuum actuated holding members. The cutter is driven directly from the turret plate drive so that the cutter operates in synchronism with the main drive of the machine.

Because aesthetics are becoming more important, even in tamper evident labeling, the label material typically now includes artistic indicia evenly spaced throughout. In a prior art machine, the cutter cuts at any point on the fed label at timed sequences based on turret plate rotation, so that there is often no control over the exact location of label cutting at higher operating speeds. In many tamper evident labels which are plain colored, exact registration of the label and cutting is not necessary.

More advanced and aesthetically designed packaging, however, mandates greater control over the location of label printing and cutting to ensure that the design is replicated on the label, and not cut therethrough. This is also necessary to ensure that any subsequent artistic indicia placed on the strip of label material are not cut. This can be difficult during high speed production runs when the film stretches during operation.

Thus, it is necessary to provide a registration system with a banding machine described above which allows accurate cutting of a label at a known location to ensure that the band is complete with all proper indicia located on the band.

SUMMARY OF THE INVENTION

In accordance with the present invention, the banding machine applies labels to the tops of containers and has a means for initiating a feed roller for feeding film upon rotation of a turret plate and movement of a band holder into an indexed position. A sensor is mounted on a frame for selective movement in an arcuate arc adjacent to the circular arc defined by band holders as the turret plate rotates so that the sensed position of a band holder relative to the cutting motion of a cutting blade can be varied to ensure feeding a film during a non cutting sequence.

Thus, the present invention now provides greater control over film feed to ensure that film feed occurs during the optimum time when a scissors blade is in a non cutting position. Additionally, the present invention provides a registration sensor which is adjustably moveable in the linear direction of film feed to allow film stopping and cutting at a predetermined film location corresponding to a desired film indicia.

In accordance with the present invention, the banding machine applies labels to the tops of containers and includes a frame and a turret plate rotatably mounted on the frame. A main drive mechanism rotates the turret plate. A plurality of band holders are positioned on the turret plate for a) receiving cut film sleeves having spaced indicia thereon in a unopened, flattened condition; b) opening the band into a circular sleeve and; c) holding and moving the band onto the top of a vertically oriented container advancing into a banding position.

A feed roller with a stepper motor drive advances film a predetermined amount corresponding to the desired cut length of the band. A cutter is operatively connected to the turret plate drive mechanism and operates in a cutting sequence based on turret plate rotation for receiving and cutting film into the cut lengths for delivery into the band holders.

A registration sensor senses the film indicia before cutting and generates a signal indicative of the sensed registration. A controller receives the registration signal and stops film advancement upon detection of film indicia so as to initiate film cutting at a predetermined film location and initiate film feeding again to advance film a predetermined amount for a new cut label.

A feed roller is initiated for feeding film upon rotation of the turret plate and movement of a band holder into an indexed position. The feed roller initiator includes a sensor mounted on the frame for selective movement in an arcuate arc adjacent to the circular arc defined by the band holders as the turret plate rotates so that the sensed position of a band holder relative to the cutting motion of the blade can be varied to ensure feeding of film during noncutting sequence.

A probe target is mounted on the turret plate adjacent each band holder and the sensor senses a probe target and generates a signal to the controller for initiating film feed. The controller includes a logic module operatively connected to the registration sensor and the stepper motor. The logic module includes a mechanism for generating a termination signal to the stepper motor for stopping the film feed after receiving a registration signal. The logic module includes a timer wherein the stepper motor is reset after a predetermined amount of time. A thumb wheel switch mechanism is operatively connected to the stepper motor and has values indicative of the length of film to be fed. The registration sensor is positioned a predetermined distance from the cutter.

In another aspect of the present invention, at least two parallel support plates are fixed to the frame and extend over the upper portion of the turret plate. At least one feed roller is positioned between and mounted to the support plates for feeding film in a path of travel between the support plates. The stepper motor is coupled to the feed roller and drives the feed roller and advances film a predetermined amount corresponding to the desired cut length of the band.

A sensor support bracket is adjustably mounted on at least one support plate for movement linearly in the film feed direction. The bracket is linearly positioned on the support plate at a position so that any film indicia is sensed during film at a point to allow film stopping and cutting at a predetermined film location corresponding to a desired film indicia.

The support plates include upper edges and the sensor support bracket straddles the upper edge of the support plates and is moveable thereon. Each band holder includes two opposing film gripping members for engaging a band of film material and drawing a vacuum for retaining a band thereto. An article conveyor is positioned adjacent the banding position and conveys articles into a position adjacent to the banding position so that the bands can be inserted over the article top.

DESCRIPTION OF THE DRAWINGS

These advantages and other features of the present invention are set forth more completely in the description that follows and the accompanying drawings in which.

DETAILED DESCRIPTION OF THE INVENTION

Figure 1:
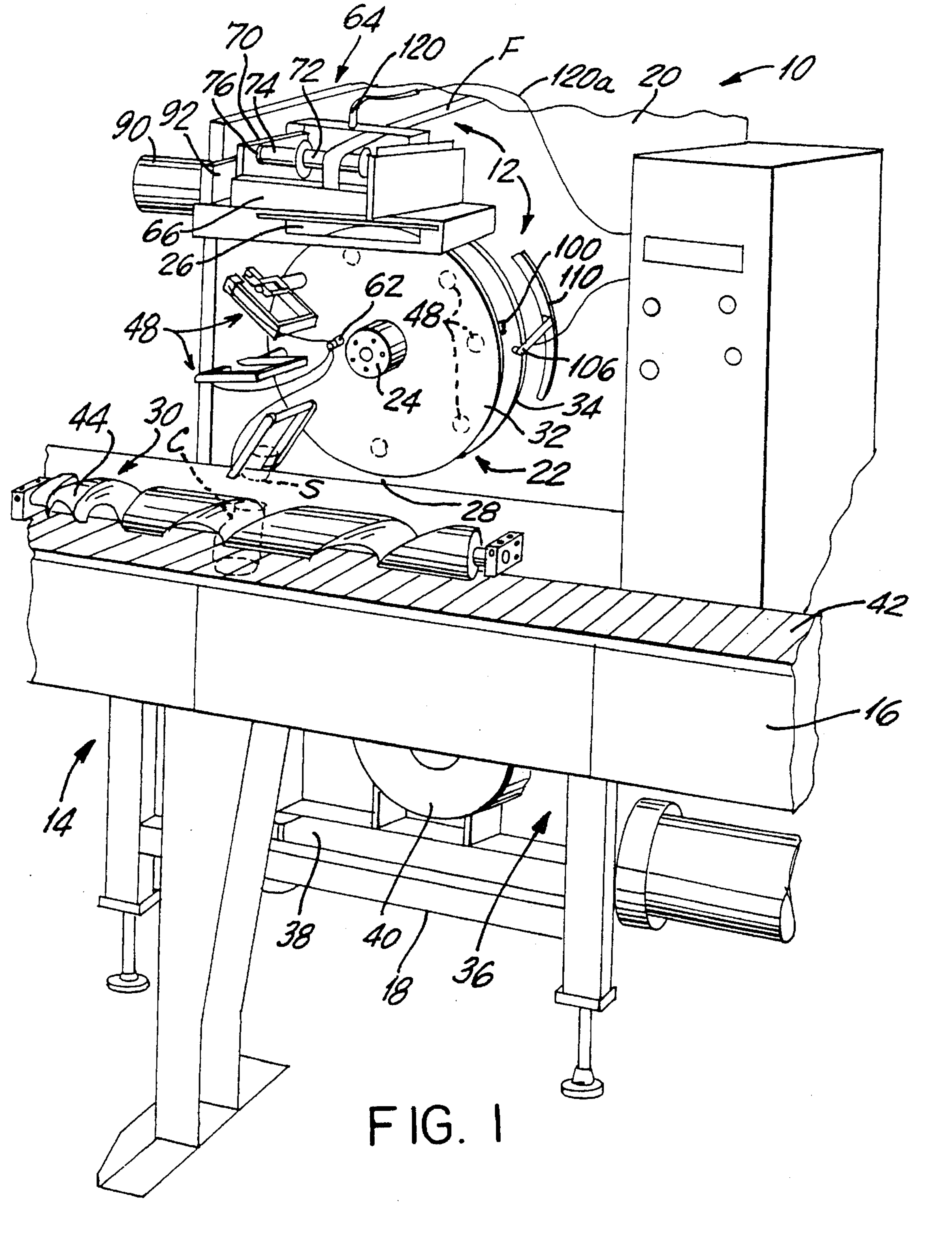
FIG. 1 is a general environmental view of the banding machine in accordance with the present invention illustrating three out of eight band holders.

Referring now to FIG. 1, there is illustrated generally at 10 the banding machine in accordance with the present invention, including the improved film registration system of the present invention, indicated generally at 12, which advances film into a cutter for cutting the film at a predetermined location for delivery to band holders which open the band into a circular sleeve and move it onto the top of a vertically oriented container advancing into a banding position.

The banding machine 10 includes a frame, indicated generally at 14, having a horizontal base member 16 to which is connected a leg assembly 18 for supporting the base member. A vertically oriented rear frame plate 20 extends upward from the base member.

A circular configured turret plate, indicated at 22, is rotatably mounted in vertical configuration on the rear frame plate 20 by means of a drive shaft 24. The turret plate 22 defines an upper band entrance position 26 for receiving cut sleeve material and a lower banding position 28 where opened band sleeves are inserted onto vertically oriented containers (shown in hidden line configuration at C) conveyed along an article conveyor, indicated generally at 30. Although not illustrated in detail, the turret plate 22 has respective front and rear plates 32, 34 supported by the drive shaft 24. Both plates together will be referred to as the turret plate 22.

A main drive mechanism, indicated at 36, is mounted on support plates 38 connected to the leg assembly and includes an electric drive motor 40 and transmission mechanism (not shown in detail) extending upward to the rear portion of the turret plate drive shaft 24. The drive motor 40 also connects to the article conveyor 30 which includes a chain-style conveyor member 42 positioned on top of the base member 16 and a screw or worm thread feed 44 which is driven by the main drive mechanism 36 so that the worm feed 44 is driven in synchronism with the turret plate 22. Containers are conveyed along the belt chain conveyor where they are then received into the screw thread feed 44 and thus move in synchronism with turret plate rotation. As illustrated schematically in FIG. 1, the worm feed 44 is synchronized so that a container is moved into the banding position when a band holder has moved into that same position.

Figure 2:
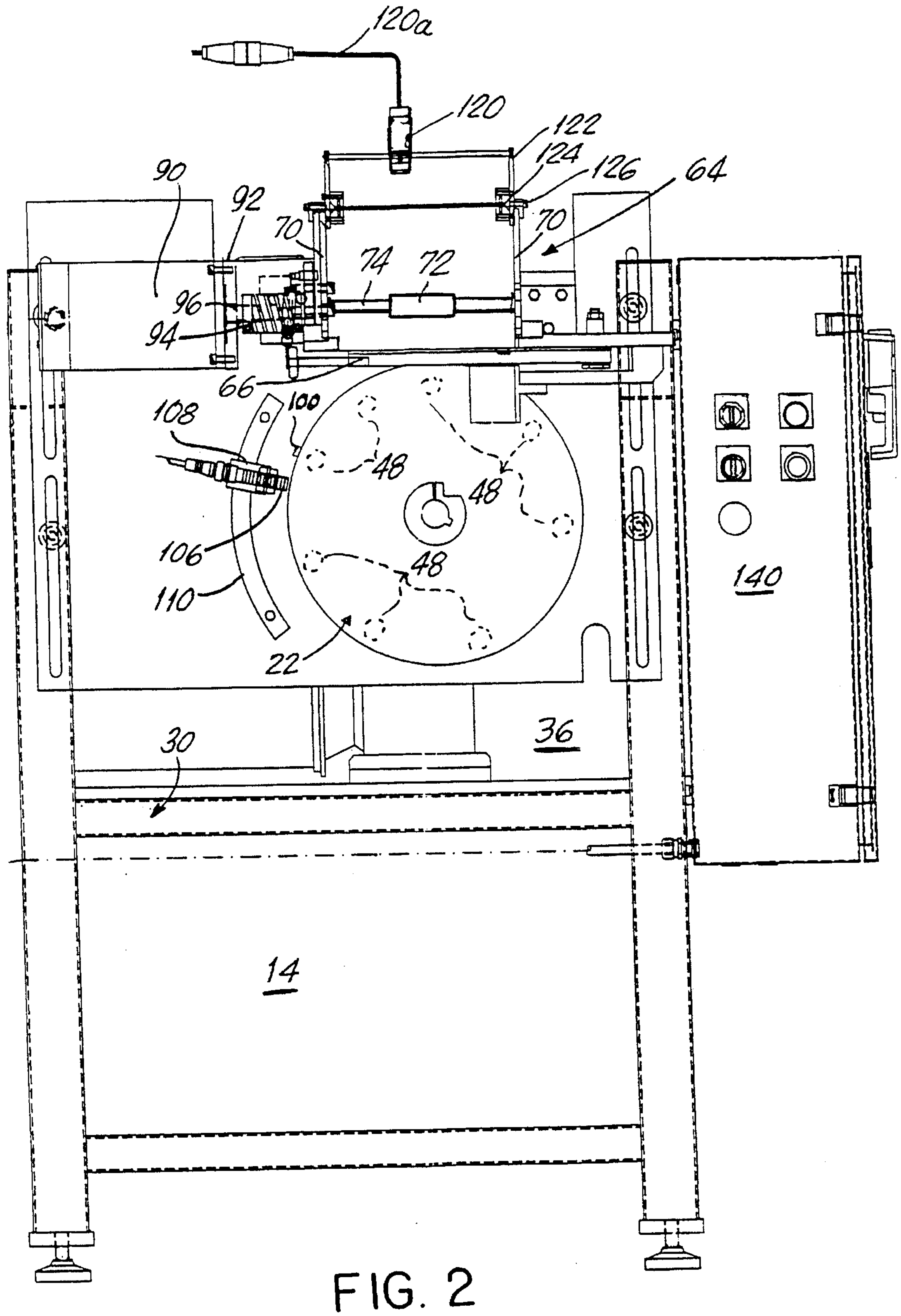
FIG. 2 is a schematic front elevational view of the banding machine of the present invention.

As shown in FIGS. 1 and 2, a plurality of band holders, indicated generally at 48, are substantially evenly spaced on the turret plate 22 for receiving an unopened, flattened band at the band entrance position 26, opening the band into a circular sleeve "S" (FIG. 4), and then holding and moving the band in its opened sleeve configuration into the banding position 28 and onto the top of a vertically oriented container C advancing into the banding position. In the illustrated embodiment, eight substantially evenly spaced band holders 48 are illustrated. The number of band holders 48 used with the machine 10 can vary, however, depending on the size of articles to be banded, the desired banding speed, and other factors.

Figure 4:
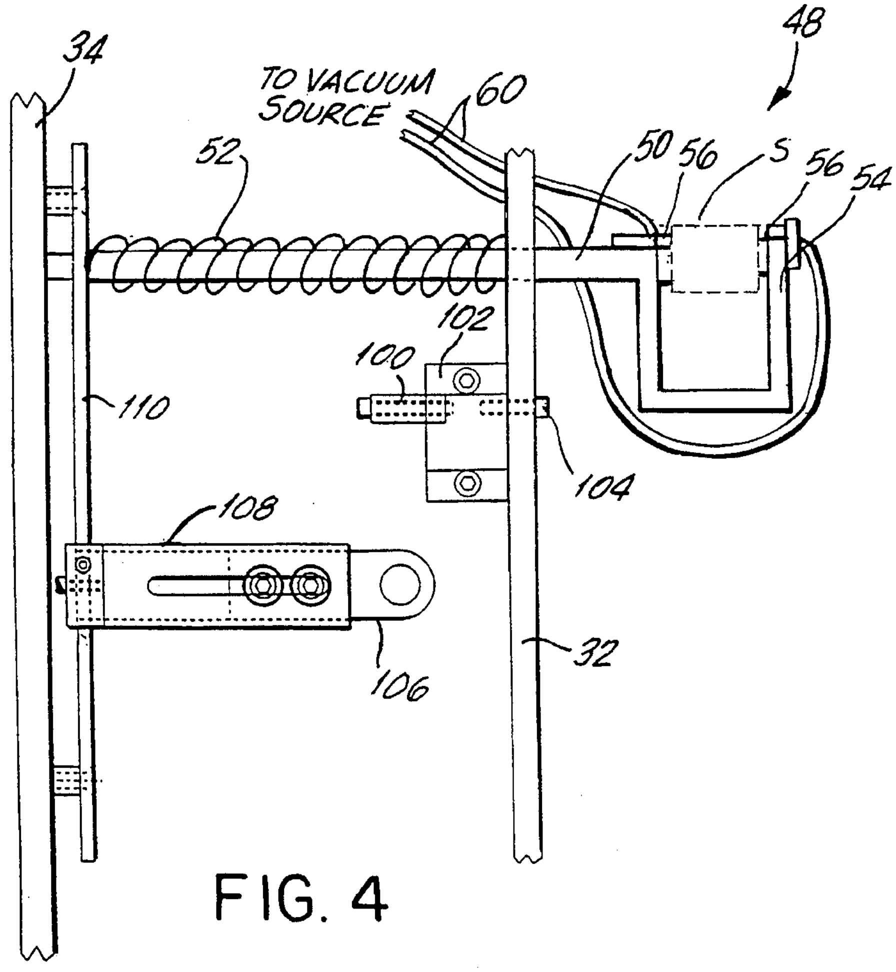
FIG. 4 is a side elevational view of the band holders, probe target and sensor.

As shown in FIG. 4, each band holder 48 is formed from a spring biased shaft 50 extending through the front turret plate 32 adjacent the outer peripheral edge of the turret plate to the rear turret plate 34. A spring 52 extends between the rear of the shaft 50 and the front turret plate and provides biasing force outward on the shaft 50. A rectangular configured holding member 54 is secured to the shaft 50 and extends outward from the end of the shaft. Each end of the rectangular configured holding member includes a laterally projecting support and film gripping member 56 connected on the support. Each gripping member includes a soft padded surface and vacuum orifices 58 extending through the gripping member 56. Each gripping member also has one end of a vacuum tube 60 connected thereto which communicates with the orifices 58. The other end of the vacuum tube connects to a common coupler member 62 (FIG. 1). Each couple member extends through the turret 32 into a common manifold (not shown) which connects to a source of vacuum.

A film feed and cutting system, also known as a feed-knife unit, indicated generally at 64, is mounted to the top portion of the upright rear frame member 20 for feeding film into a cutter 66 for producing cut film segments. As illustrated, two substantially parallel and vertically oriented support plates 70 are fixed to the rear frame 20 and extend over the upper portion of the turret plate 22 at its upper band entrance position 26. At least one feed roller 72 is positioned between and mounted to the support plates on a central shaft 74 having ends with bearings 76 mounting the feed roll to the support plates 70. The cutter 66 is positioned adjacent the band entrance position 26 and mounted to a lower portion of the support plates 70. In the desired embodiment, the cutter 66 is a scissors knife unit directly coupled to the drive mechanism 36 and opens and closes in synchronism with the turret plate rotation. With eight band holders, the scissors knife 66 would open and close eight times for each one turret plate 22 rotation.

Figure 8:
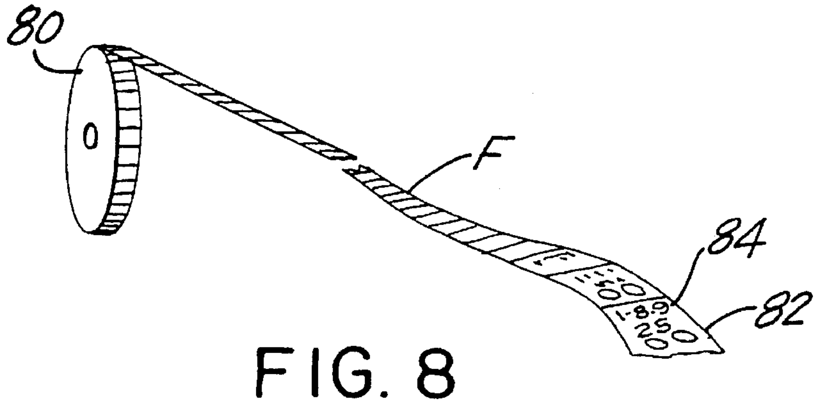
FIG. 8 illustrates a roll of banding film and shows indicia and date coding thereon.

In accordance with the present invention, film "F" is supplied from a film supply roll 80 (FIG. 8) located at the rear of the frame. The film is fed in flattened condition and comprises a compacted sleeve which can be later opened into a sleeve "S" or band and placed over a container "C". The film "F" has indicia 82 marked thereon as well as other indicia such as a date code 84 for the banded product. Thus, accurate registration and cutting is necessary during banding to ensure that the cut does not occur on the date code 84 or the indicia 82.

Some banding machines prior to the present invention had a mechanical gear linkage connecting the drive motor 40, feed roller 72 and cutter 66 so that film was fed by the feed roller between the support plates 70 and into the cutter 66. Sometimes the feed roller was driven by a separate stepper or other motor. Typically, older units were designed for use with film having only a constant, uninterrupted design pattern thereon so that accurate cutting was not required. Accordingly, the feed roll speed and cutter were adjusted only to cut certain length labels without regard to the position of the ornamental design on the label. After the film was cut into the proper length segment, the film dropped between the gripping members 56 where its vacuum draw grabbed the film and opened it into an opened sleeve configuration "S". The gripping members 56 held the member in its opened position and moved it into the banding position where the sleeve was placed over the container, which was moving by the worm thread 44 into its banding position.

As shown in FIGS. 1 and 2, the improved film registration system 64 of the present invention allows the sensing of spaced indicia so that cutting occurs at a desired location on the film, e.g., between the spaced indicia. This present invention allows more aesthetic and ornamental banding designs while also providing for trade name, logo or date code displays on the bands without inadvertent cutting on the logos, names or date codes during high speed production runs. In the previous banding machines without the present invention, cutting accuracy was not preserved, and cutting occurred anywhere on the label. Additionally, as the film stretched, no accommodation was made for adjusting film feed to cut on specified points of the label.

As illustrated in FIGS. 1 and 2, a stepper motor 90 is coupled to the drive shaft 74 of feed roller 72. The stepper motor 90 is mounted on a bracket plate 92 fixed to one of the vertically oriented support plates 70. A shaft coupler 94 connects directly to the output shaft 96 of the stepper motor 90 and the drive shaft 74 of the feed roller (FIG. 2).

As shown in FIGS. 1, 2, and 4 a probe target 100 is mounted on the front turret plate 32 adjacent each band holder 48. The probe target is mounted on a cylinder clamp block 102 secured to the rear of the front turret plate 32 by screws 104. A probe sensor 106 is secured on a bracket member 108, which in turn is movably mounted on a guide bar 110 mounted to and spaced offset from the upright frame 20. The guide bar 110 is arcuately configured so that it extends a portion of the arc distance defined by the circular arc formed by the probe targets 100 as the turret plate 22 rotates. The probe sensor 106 can be moved along a circular arc defined by guide bar 110 fixed to the upright frame 20. The probe sensor 106 is positioned by moving the bracket member 108 on the guide bar 110 to a known index point defined by the turret rotation. The probe sensor 106 indicates when a probe target 100 has rotated into a position opposite the probe sensor 106.

Figure 5:
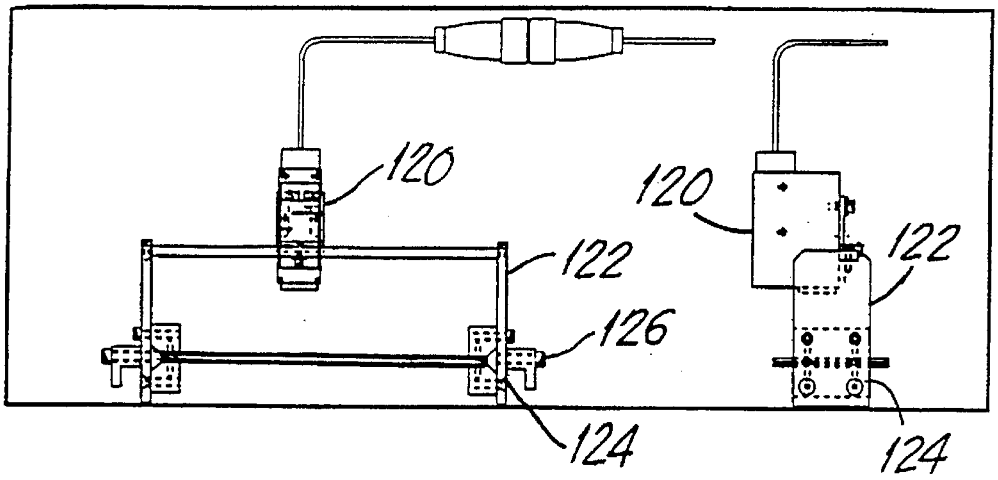
FIG. 5 is a front elevational view of one embodiment of the registration sensor of the present invention.

As shown in FIG. 2, a registration sensor 120 is mounted above the film feed between the support plates 70, and in the illustrated embodiment of FIG. 2, is mounted to a sensor support member 122 extending laterally across the upper edges of the support plates and linearly movable thereon by support clamps 124. Mounting screws 126 lock the support clamps 124 and thus the registration sensor 120 in a desired position relative to the cutter 66. The registration sensor 120 senses film indicia as the film is fed between the support plates 70 and generates a signal indicative of label indicia. In one aspect of the present invention as shown in FIG. 5, the registration sensor 120 is a color mark registration sensor which can utilize a color contrast sensor and typically may include two light sources (not shown). The sensor 120 detects a color registration mark that is printed onto the material to be labeled. As is well known to those skilled in the art, there should be significant color contrast between any registration mark and the rest of the band graphics.

Figure 6:
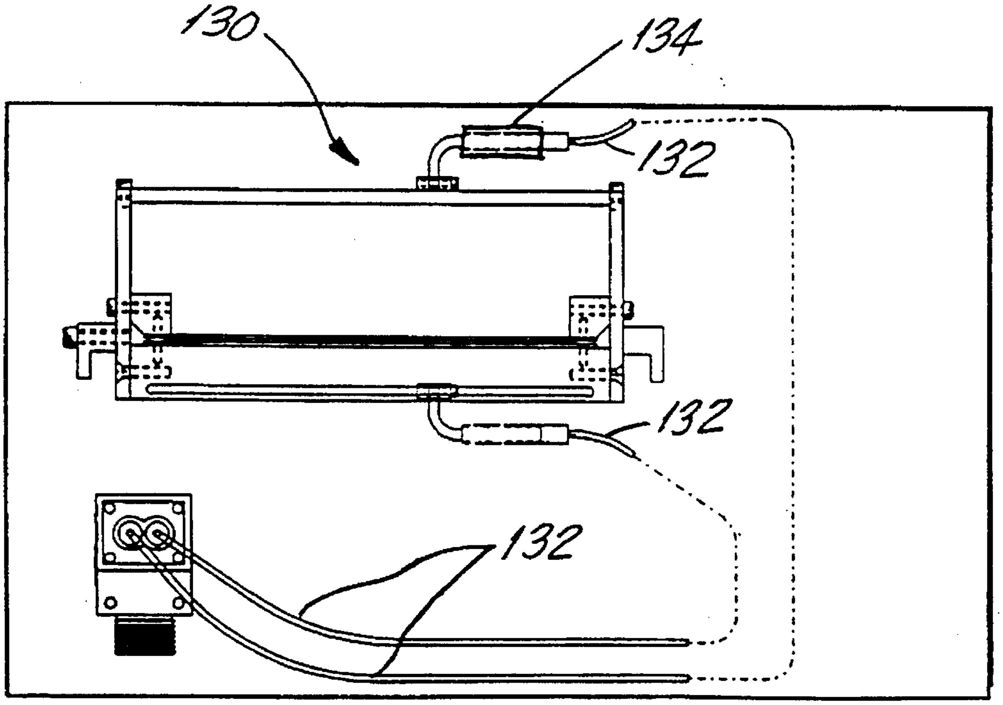
FIG. 6 is a front elevational view of another embodiment of the registration sensor showing the use of fiber optics.

In another embodiment of the invention shown in FIG. 6, the registration sensor 130 is a through beam sensor using fiber optic cables and includes a light emitting diode 134 which generates a pulse through the fiber optic cable 132 and is received in a receiver/sensor 136 located beneath the fed film. The sensor 130 detects for a clear zone between the graphics of each label.

Figure 3:
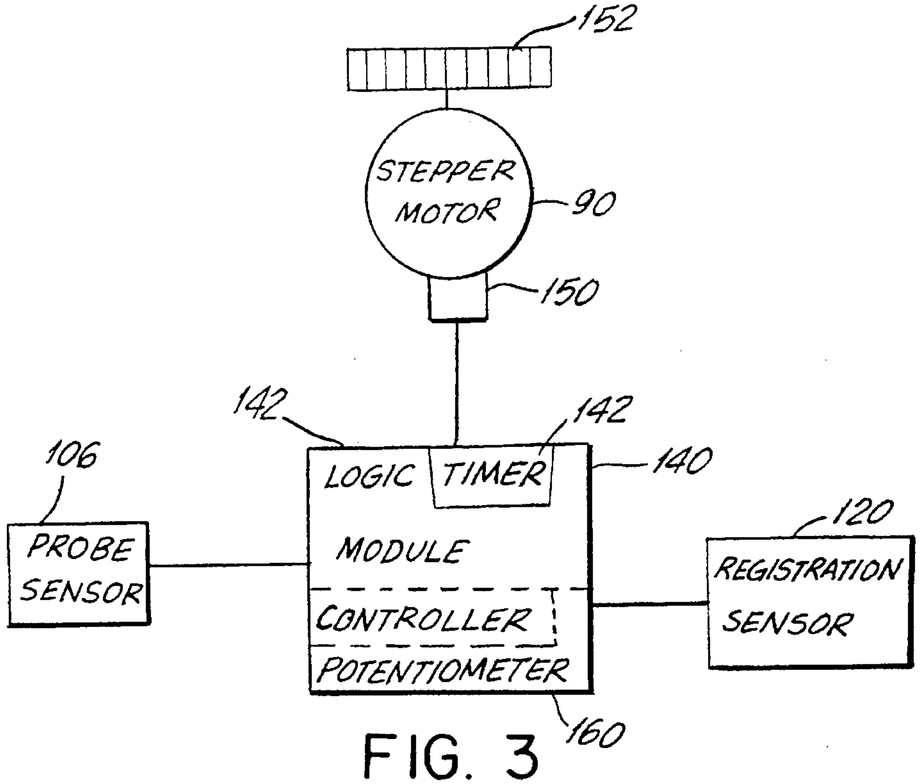
FIG. 3 is a block diagram showing various devices and components of the banding machine of the present invention.

Both the probe sensor and the registration sensor are operatively connected to a main controller, indicated generally at 140, which can be a controller such as a Model DPB11RA Series with CL1710 control link board sold by Anaheim Automation of Anaheim, Calif. Conventional sensory wires, **106*a*, 120*a*, connect the sensors to the controller 140. The controller 140 includes a logic module 142 (FIG. 3) operatively connected to the registration sensor 120 and the stepper motor 90. The logic module 142 generates a termination signal to the stepper motor for stopping stepper motor operation after receiving a registration signal from the registration sensor 120. The logic module 142 includes a timer 144** and the stepper motor is reset after a predetermined amount of time has passed.

The logic module 142 acts as a one shot logic module timer which is set to 10 milliseconds. When the one shot logic module 102 is activated, it energizes a registration solid state relay (not shown) connected to a stepper motor controller 150 (FIG. 3) for 10 milliseconds. The stepper motor controller 150 can be either part of the stepper motor or a separate unit connected thereto. Typically, it is purchased with the stepper motor 90.

When the circuitry of the stepper motor controller 150 is activated, it causes the stepper motor 90 to stop immediately from the step it is executing and thus stop film feed motion. The one shot logic module 142 is used to unlatch the stepper motor after 10 milliseconds, allowing the next film feed index cycle to start. Additionally, a plurality of thumbwheel switches 152 (FIG. 3) are operatively connected to the stepper motor, and is well known to those skilled in the art, are set to a value indicative of the length of film to be fed. During these operational sequences, the probe sensor 106 generates signals indicative of the position of the probe target 100 to the stepper motor 90 for initiating stepper motor operation and film feed.

The system of the present invention can be set up with little difficulty. The position of the probe sensor 106 can be dependent on three factors:

1) the length of the band to be cut,

2) the flat width of the banding material, and

3) the speed at which the machine is to operate.

The first step set up is to position the probe sensor 106 by hand cranking the machine 10 until the machine reference position is reached. The machine reference position is that point which is required to set the position of the probe sensor 90 where the scissors cutter 66 has just reached its fully extended position. This reference point ensures that the cutter 66 will not be an obstruction when the stepper motor 90 is feeding banding material. When the machine is set at that reference point, the probe sensor 106 be set to a position where the probe sensor 106 is just sensing the leading edge of the target probe 100.

The film feed length is controlled by the value of the thumbwheel switches 152 located typically inside a closure of the controller 140. Each increment of the thumbwheel switches relates to one step of the stepper motor 90. The stepper motor controller 150 can be set to half step mode of operation. Thus, if the stepper motor 90 is listed as having 200 steps per revolution, the stepper motor controller in the half step mode will have 400 steps per revolution. By running the stepper motor controller in the half-step mode, greater resolution of the registration unit is achieved.

Typically, the required banding film material feed length is dependent on the registered film repeat length. The film material feed length should be set to a minimum of 1/16 inch longer than the repeat length of the registered film. This is desired to ensure that any registration mark or indicia passes under the registration sensor on each stepper motor index cycle. This also aids in stopping the stepper motor when a registration mark is sensed since the motor is in the deceleration portion of movement. The length of fed material can be changed by changing the value of the thumbwheel switches 152. The longer the value, the longer the feed length.

The color contrast sensor 120 can be set up by first determining which of two light sources typically internal to the sensor creates the greatest amount of contrast between the registration mark color and the color of the shrinked band background. This is referred to as contrast evaluation. After the registration sensor 120 is adjusted to achieve an adequate level of contrast, the sensor 120 then can be set for either light or dark operation. This choice does not affect the operation of the registration system. At this point, the registration sensor is ready to operate.

The through beam sensor 130 is first set up by ensuring that the fiber optics 132 are in line with one another. Next, sensor operation is confirmed by sensing and loading film and determining if the LED 134 on top of the sensor will illuminate when the sensor locates the clear zone on the film. If the indicator lights do not turn on, then a "gain" potentiometer 160 in the sensor 140 must be increased. If the indicator lights stay on over the entire length of the shrink band, then the "gain" potentiometer 160 must be decreased.

To properly set the "gain" potentiometer 160, the clear zone of the shrink band is positioned directly in the path of the two fiber optics. The "gain" potentiometer 160 is adjusted until the "sense" and "load" LED turns on. The shrink band is moved until the opaque zone of the band is directly in the path of the fiber optics. The "gain" potentiometer 160 is increased until the "sense" and "load" LED turn on. The number of turns of the potentiometer 160 it took for the sense and load LED to turn on is noted. The total turns difference between the setting of the gain potentiometer 160 for the clear to opaque zones is halted, and the gain potentiometer 160 is turned back that amount.

When the registration sensor contrast adjustment is properly set up, the machine 10 can be started. As the machine feeds and cuts material, the position of film being cut at the cutter 66 should be checked. If the film is cut at the wrong position of the shrink band, the clamps 124 on both sides of the registration unit can be loosened and the entire unit slid on the support plates 70. As the registration sensor 120 is moved, the cut-off position of film material will move that amount.

Figure 7:
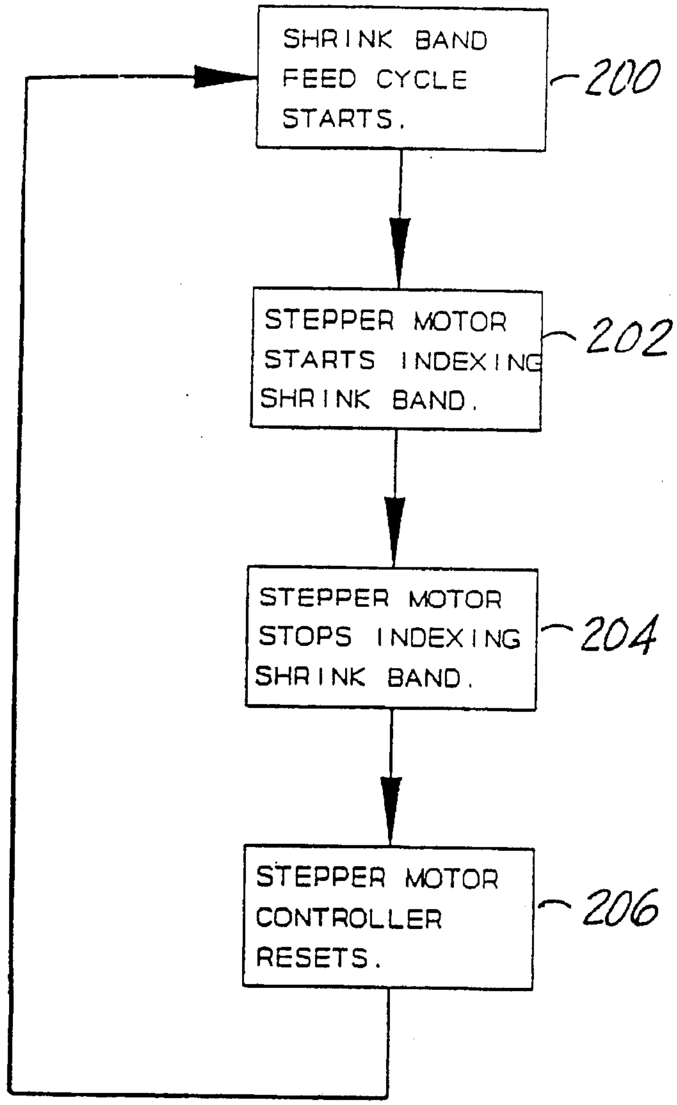
FIG. 7 is a flow chart depicting the operation of a banding machine of the present invention.

As shown in the flow diagram of FIG. 7, the operation cycle is straightforward. The cycle is started (Block 200) when the probe sensor 106 is triggered by a target probe 100 mounted to the turret plate 32. When the probe is triggered, the stepper motor will start feeding the band film at the value that the thumbwheel switches have been set (Block 202). The value of the thumbwheel switches is equal to a shrink band cut length 1/16 inch longer than the registration mark repeat length. The stepper motor continues to feed the shrink band until the registration sensor is triggered. Once the registration sensor is triggered, the stepper motor stops feeding the shrink band immediately (Block 204). At this point, the shrink band is cut into the desired registered length. As soon as the registration sensor's one shot signal is no longer present, the stepper motor controller automatically resets itself and at this point it is ready to be cycled again to feed the shrink band to the value of the thumbwheel switches (Block 206).

It is to be understood that the above description is only one preferred embodiment of the invention. Numerous other arrangements may be devised by one skilled in the art without departing from the spirit and scope of the invention.

That which is claimed is:

1. A banding machine for applying labels to the tops of containers comprising a frame, a turret plate rotatably mounted on said frame, drive means for rotating said turret plate, a plurality of band holders positioned on said turret plate for a) receiving cut film sleeves having spaced indicia thereon in an unopened, flattened condition; b) opening the band into a circular sleeve; and c) holding and moving the band onto the top of a vertically oriented container advancing into a banding position, feed roller means for advancing film a predetermined amount corresponding to the desired cut length of the band, a cutter operatively connected to said turret plate drive means and operating in a cutting sequence based on turret plate rotation for receiving and cutting film into cut lengths for delivery into said band holders, registration sensing means for sensing film indicia before cutting and generating a signal indicative of said sensed registration, control means for receiving said registration signal and stopping film advancement upon detection of film indicia so as to initiate film cutting at a predetermined film location and to initiate film feeding again to advance film a predetermined amount for a new cut label, and means for initiating said feed roller means for feeding of film upon rotation of said turret plate and movement of a band holder into an indexed position, said feed roller initiating means including sensor means mounted on said frame for selective movement in an arcuate arc adjacent the circular arc defined by said band holders as said turret plate rotates so that the sensed position of a band holder relative to the cutter sequence can be varied to ensure film feeding during a noncutting sequence.

2. The banding machine according to claim 1 including a probe target mounted on the turret plate adjacent each band holder, wherein said sensor means senses a probe target and generates a signal to said control means for initiating film feed.

3. The banding machine according to claim 1 wherein said control means includes a logic module operatively connected to said registration sensor and said film feed means, said logic module including means for generating a termination signal to said film feed means for stopping film feed after receiving a registration signal.

4. The banding machine according to claim 3 wherein said logic module includes a timer, wherein said film feed means is reset after a predetermined amount of time.

5. The banding machine according to claim 1 wherein said knife comprises a scissors knife operatively connected to said turret plate drive means.

6. The banding machine according to claim 1 including thumbwheel switch means operatively connected to said film feed means and having a value indicative of the length of film to be fed.

7. The banding machine according to claim 1 wherein said registration sensor is positioned a predetermined distance from the cutter.

8. The banding machine according to claim 1 wherein said film feed means comprises a stepper motor.

9. The banding machine according to claim 1 including an arcuately configured mounting bracket positioned on said frame adjacent said turret plate, said sensor means being movably mounted thereon for arcuate movement about said turret plate.

10. A banding machine for applying labels to the tops of containers comprising a frame, a turret plate rotatably mounted on said frame, drive means for rotating said turret plate, a plurality of band holders positioned on said turret plate for a) receiving cut film sleeves having spaced indicia thereon in an unopened, flattened condition; b) opening the band into a circular sleeve; and c) holding and moving the band onto the top of a vertically oriented container advancing into a banding position, at least two parallel support plates fixed to said frame and extending over an upper portion of the turret plate, at least one feed roller positioned between and mounted to the support plates for feeding film in a path of travel between the support plates, a stepper motor coupled to the feed roller for driving the feed roller and advancing film a predetermined amount corresponding to the desired cut length of the band, a cutter for receiving and cutting film into cut lengths for delivery into said band holders, a support bracket adjustably mounted on at least one support plate for movement linearly in the film feed direction, registration sensing means mounted on said support bracket for sensing film indicia fed between said plates and generating a signal indicative of said sensed registration, and control means for receiving said registration signal and stopping film advancement upon detection of film indicia for film cutting at a predetermined film location and then initiating said motor to advance film again a predetermined amount after cutting, wherein said bracket is linearly positioned on said support plate at a position to sense film indicia at a point to allow film stopping and cutting at a predetermined location on the film corresponding to a desired film indicia.

11. The banding machine according to claim 10 including means for initiating stepper motor operation for feeding of film upon rotation of said turret plate and movement of a band holder into an indexed position.

12. The banding machine according to claim 10 wherein said stepper motor is mounted to a support plate.

13. The banding machine according to claim 10 wherein said support plates include upper edges, said bracket straddling said upper edges of said support plates and movable thereon.

14. The banding machine according to claim 10 wherein said sensor comprises a fiber optic sensor.

15. The banding machine according to claim 10 wherein said control means includes a logic module operatively connected to said registration sensor and said stepper motor, said logic module including means for generating a termination signal to said stepper motor for stopping stepper motor operation after receiving a registration signal.

16. The banding machine according to claim 15 wherein said logic module includes a timer, wherein said stepper motor is reset after a predetermined amount of time.

17. The banding machine according to claim 10 wherein said cutter comprises a scissors knife operatively connected to said drive means and operating in a cutting sequence based on turret plate rotation.

18. The banding machine according to claim 10 including thumbwheel switch means operatively connected to said stepper motor and having a value indicative of the length of film to be fed.

19. The system according to claim 10 wherein said registration sensor is positioned a predetermined distance from the cutter based on the desired cutting location on the film.

20. A banding machine for applying labels to the tops of containers comprising a frame, a turret plate rotatably mounted on said frame, drive means for rotating said turret plate, a plurality of band holders positioned on said turret plate for a) receiving cut film sleeves having spaced indicia thereon in an unopened, flattened condition; b) opening the band into a circular sleeve; and c) holding and moving the band onto the top of a vertically oriented container advancing into a banding position, at least two parallel support plates fixed to said frame and extending over an upper portion of the turret plate, at least one feed roller positioned between and mounted to the support plates for feeding film in a path of travel between the support plates, a stepper motor coupled to the feed roller for driving the feed roller and advancing film a predetermined amount corresponding to the desired cut length of the band, a cutter operatively connected to said turret plate drive means and operating in a cutting sequence based on turret plate rotation for receiving and cutting film into cut lengths for delivery into said band holder, a support bracket adjustable mounted on at least one support plate for movement linearly in the film feed direction, registration sensing means mounted on said support bracket for sensing film indicia fed between said plates before cutting and generating a signal indicative of said sensed registration, and control means for receiving said registration signal and stopping film advancement upon detection of film indicia so as to initiate film cutting at a predetermined film location and initiate said stepper motor to advance film against a predetermined amount after cutting, wherein said bracket is linearly positioned on said support plate at a position so that any film indicia is sensed during film feed at a point to allow film stopping and cutting at a predetermined film location corresponding to a desired film indicia, and means for initiating stepper motor operation for feeding of film upon rotation of said turret plate and movement of a band holder into an indexed position, said stepper motor initiating means including sensor means mounted on said frame for selective movement in an arcuate arc adjacent the circular arc defined by said band holders as said turret plate rotates so that the sensed position of a band holder relative to the cutter sequence of the cutter blade can be varied to ensure film feeding during a noncutting sequence.

21. A banding machine according to claim 20 including a probe target mounted on the turret plate adjacent each band holder, wherein said sensor means senses a probe target and generates a signal to said control means for initiating stepper motor operation and film feed.

22. The banding machine according to claim 20 wherein said control means includes a logic module operatively connected to said registration sensor and said stepper motor, said logic module including means for generating a termination signal to said stepper motor for stopping stepper motor operation after receiving a registration signal from said registration sensor.

23. The banding machine according to claim 22 wherein said logic module includes a timer, wherein said stepper motor is reset after a predetermined amount of time.

24. The banding machine according to claim 20 wherein said knife comprises a scissors knife operatively connected to said drive means.

25. The banding machine according to claim 20 including thumbwheel switch means operatively connected to said stepper motor and having a value indicative of the length of film to be fed.

26. The banding machine according to claim 20 including an arcuate configured mounting bracket positioned on said frame adjacent said turret plate, said sensor means being movably mounted thereon for arcuate movement about said turret plate.

27. The banding machine according to claim 20 wherein said registration sensor is positioned a predetermined distance from the cutter based on the desired cut location on the film.

28. A banding machine for applying labels to the tops of containers comprising a frame, a substantially circular configured and vertically oriented turret plate rotatably mounted on said frame, drive means for rotating said turret plate, a plurality of band holders positioned on said turret plate for a) receiving cut film sleeves having spaced indicia thereon in an unopened, flattened condition; b) opening the band into a circular sleeve; and c) holding and moving the band onto the top of a vertically oriented container advancing into a banding position, said band holders including two opposing film gripping members for engaging a band of film material, each member including means for drawing a vacuum for retaining a band thereto, an article conveyor positioned adjacent said banding position for conveying articles into a position adjacent the banding position so that the bands can be inserted over the article top, at least two parallel support plates fixed to said frame and extending over the upper portion of the turret plate, at least one feed roller positioned between and mounted to the support plates for feeding film in a path of travel between the support plates, a stepper motor coupled to the feed roller for driving the feed roller and advancing film a predetermined amount corresponding to the desired cut length of the band, a cutter operatively connected to said turret plate drive means and operating in a cutting sequence based on turret plate rotation for receiving and cutting film into cut lengths for delivery into said band holder, a support bracket adjustably mounted on at least one support plate for movement linearly in the film feed direction, registration sensing means mounted on said support bracket for sensing film indicia fed between said plates before cutting and generating a signal indicative of said sensed registration, control means for receiving said registration signal and stopping film advancement upon detection of film indicia so as to initiate film cutting at a predetermined film location and initiate said stepper motor to advance film again a predetermined amount after cutting, wherein said bracket is linearly positioned on said support plate at a position so that only film indicia is sensed during film feed at a point to allow film stopping and cutting at a predetermined film location corresponding to a cut on a desired film indicia, and means for initiating stepper motor operation for feeding of film upon rotation of said turret plate and movement of a band holder into an indexed position, said stepper motor initiating means including sensor means mounted on said frame for selective movement in an arcuate arc adjacent the circular arc defined by said band holders as said turret plate rotates so that the sensed position of a band holder relative to the cutter sequence can be varied to ensure feeding of film during a noncutting sequence operation of said cutter.

29. A banding machine according to claim 28 including a probe target mounted on the turret plate adjacent each band holder, wherein said sensor means senses a probe target and generates a signal to said control means for initiating stepper motor operation and film feed.

30. The banding machine according to claim 28 wherein said control means includes a logic module operatively connected to said registration sensor and said stepper motor, said logic module including means for generating a termination signal to said stepper motor for terminating film feed.

31. The banding machine according to claim 30 wherein said logic module includes a timer, wherein said stepper motor is reset after a predetermined amount of time.

32. The banding machine according to claim 28 wherein said knife comprises a scissors knife operatively connected to said drive means.

33. The banding machine according to claim 28 including thumbwheel switch means operatively connected to said stepper motor and having a value indicative of the length of film to be fed.

34. The banding machine according to claim 28 wherein said registration sensor is positioned a predetermined distance from the cutter based on the desired location on the film.

35. The banding machine according to claim 28 wherein said stepper motor is mounted to a support plate.

36. The banding machine according to claim 28 wherein said support plate includes upper edges, said bracket straddling said upper edges of said support plates and being moveable thereon.

37. The banding machine according to claim 28 wherein said sensor comprises a fiber optic sensor.

* * * * *